June 30, 1959 W. H. RYAN ET AL 2,892,382
LIGHT-POLARIZING PROCESS AND PRODUCT
Filed July 2, 1956

INVENTORS
William H. Ryan
and
Vivian K. Walworth

BY Brown and Mikulka

ATTORNEYS

United States Patent Office 2,892,382
Patented June 30, 1959

2,892,382
LIGHT-POLARIZING PROCESS AND PRODUCT

William H. Ryan, Billerica, and Vivian K. Walworth, Concord, Mass., assignors to Polaroid Corporation, Cambridge, Mass., a corporation of Delaware Application July 2, 1956, Serial No. 595,211

33 Claims. (Cl. 88—65)

This invention relates to processes for providing improved dichroic dye light-polarizing means, especially in the form of image-bearing film which carries light-polarizing dichroic dye images, as well as to the products produced by said processes, and also relates to processes for providing sheet stock which has improved reception for dichroic dyes and the products produced by said processes.

An object of the invention is to provide processes for producing dichroic dye light-polarizing means which involve the formation into a sheet of a transparent, linear, high molecular weight, hydroxyl-containing, vinyl polymer, especially polyvinyl alcohol, the orientation of the molecules of the sheet, the dyeing of the material of the sheet with a solution of a dichroic dye, and the pretreatment of the material of the sheet prior to its dyeing with a solution of at least one electrolyte, followed by at least partially drying said material, said solution of at least one electrolyte being characterized by containing at least one ion from the class consisting of anions and cations selected from the lyotropic series and of greater activity in said series than barium or chloride.

Other objects of the invention are to provide processes of the character described for producing dichroic dye light-polarizing means having one or more layers which are rendered light-polarizing by absorbing at least one dichroic dye therein and which may, if desired, have a dye mordant such as a basic nitrogen-containing compound distributed therein; as well as to provide processes wherein said pretreatment is carried out on preformed sheet material which may have the molecules thereof in oriented condition or which may have the molecules thereof in unoriented condition; and especially to provide processes for producing improved dichroic dye light-polarizing images which may be monochromatic or multicolor images and which may be two-dimensional images or stereoscopic image pairs or two components of a stereoscopic image.

Further objects of the invention are to provide processes for producing improved sheet stock transformable into dichroic dye light-polarizing means of improved character including uniform dichroic dye polarizers and dichroic dye image-bearing film in the form of cut film or motion picture film and in which stereoscopic or two-dimensional images are producible; and to provide processes including pretreatment of the character heretofore described which are carried out with sheet stock which may, if desired, contain a basic nitrogen-containing dye mordant in any layer thereof adapted to be rendered light polarizing.

Still further objects are to provide light-polarizing products produced by processes of the character described, as well as to provide products which are transformable into light-polarizing means on the dyeing thereof with one or more dichroic dyes and which are produced by processes of the character described.

Other objects of the invention will in part be obvious and will in part appear hereinafter.

The invention accordingly comprises the several steps and the relation and order of one or more of such steps with respect to each of the others, and the products possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing wherein.

One practice for producing a light polarizer is to introduce a dichroic dye into a transparent, molecularly oriented, linear, high molecular weight, hydroxyl-containing, vinyl polymer of which a preferred example is polyvinyl alcohol. Wherever a dichroic dye is adsorbed in a molecularly oriented plastic sheet of this nature, it renders the sheet light polarizing. Oriented plastic materials of the character described are useful to provide dye polarizers and are particularly suited as a medium for providing stereoscopic, light-polarizing transparencies and prints in color.

The present invention is concerned with techniques for providing improved light-polarizing products of the character heretofore set forth. To assist in the full understanding of the nature of these techniques and the improvements provided by their use, it seems desirable at the outset to point out the general nature of the products involved and the general manner by which dye polarizers are produced.

Figure 1:
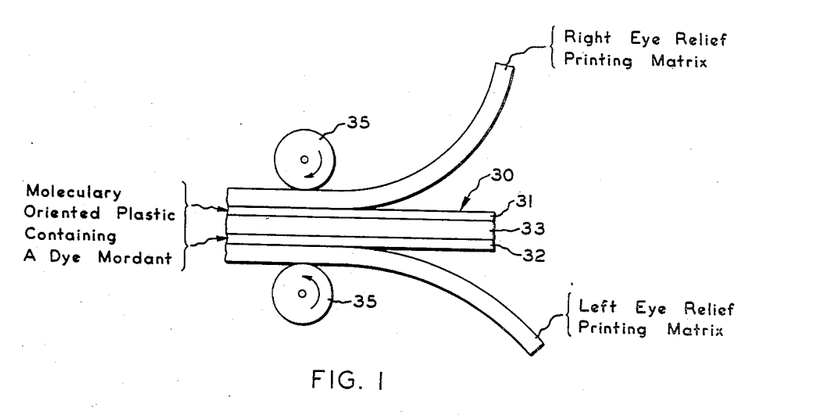
Figure 1 is a diagrammatic illustration showing the manner of forming stereoscopic pairs of superposed light-polarizing dye images in molecularly oriented film stock by the application to each side of the film stock of a printing matrix which contains, as a relief image, one of a stereoscopic pair of images to be printed and which is wet with a dichroic dye solution.

In this regard and specifically in connection with stereoscopic transparencies and color prints, a suitable medium or stock in which superposed, light-polarizing stereoscopic left- and right-eye images may be formed is provided by the film stock or printing blank 30 illustrated in Fig. 1 as comprising a laminar structure having two thin and transparent surface layers 31 and 32 mounted upon the opposite sides of a transparent support 33. The surface layers 31 and 32 are thin sheets of a transparent, molecularly oriented, high molecular weight, hydroxyl-containing, vinyl polymer of which a preferred example is polyvinyl alcohol, while the support 33 is any suitable transparent and substantially water-impermeable plastic such as cellulose acetate butyrate or cellulose triacetate.

Sheets 31 and 32 are prepared by conventional practices such, for example, as making a suitable casting composition of polyvinyl alcohol and casting this composition into a sheet. Alternatively, the composition may be applied as a coating onto an already formed sheet of polyvinyl alcohol. Regardless of how the sheets 31 and 32 are formed, they may be laminated by conventional means to the transparent support 33.

Preferably the layer 31 has its molecules so oriented that the transmission or polarizing axis of the layer will be at 45° to the edge of the film stock 30, while the layer 32 has its molecules so oriented that the transmission or polarizing axis of the layer will also be at 45° to the edge of the film stock but will make an angle of 90° with the transmission axis of the layer 31. This preferred orientation for film stock is indicated by the arrows 41 and 42 in Fig. 2 which schematically illustrates film stock 30 after image formation therein.

Film structures of this general nature are disclosed in U.S. Patents Nos. 2,289,714, 2,289,715, 2,315,373 and 2,373,035. The film stock 30 provides a transparent structure useful as motion picture film or cut film. Additionally, the film stock 30 may be mounted upon an opaque, nonpolarizing, reflecting base and used for the formation of light-polarizing reflection prints. Stereoscopic image pairs formed in the film stock 30 will be located in superposed relation to each other.

One general practice for carrying out image formation in film stock 30 is effected with conventionally prepared gelatin washoff relief printing matrices which are each provided with one or more appropriate relief records to be reproduced in a layer of the film stock, such for example as red, green and blue separation records of a three-color image to be reproduced. Two sets of matrices are employed in stereoscopic reproduction of which a first set bears left-eye image records of each stereoscopic image pair to be printed in film 30, while the other set bears corresponding right-eye images.

The individual matrices of each set are dyed with a dichroic dye or dyes and are successively pressed into registered contact with the layer of the film stock 30 in which they are to reproduce an image by dye transfer. For three-color work, the red, green and blue printing matrices are respectively used to print cyan, magenta and yellow component images by means of dye solutions of these colors which are imbibed therein and may be printed in the order just named.

A convenient means for simultaneously printing on opposite sides of the film stock 30 is schematically illustrated in Fig. 1 wherein the film stock 30 with a right-eye printing matrix and a left-eye printing matrix superposed on opposite sides thereof is shown as being passed between two rotating pressure-applying rolls 35 which cause the matrices to be pressed into intimate contact with the outer molecularly oriented layers 31 and 32 of the film stock.

Figure 2:
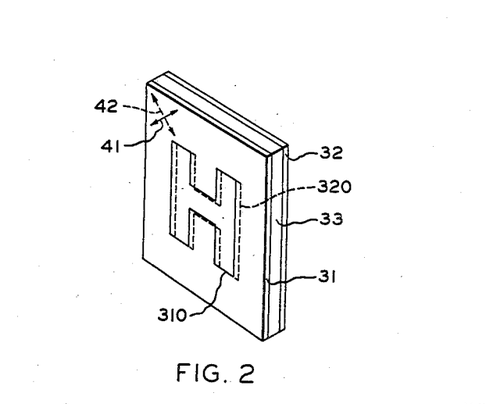
Fig. 2 is a diagrammatic perspective view of a stereoscopic color print produced on the film stock by the procedure illustrated in Fig. 1.

A transparency or product resulting from the utilization of the procedure illustrated in connection with Fig. 1 is diagrammatically shown in Fig. 2 wherein film stock 30 is illustrated as containing a right-eye stereoscopic image 310 in the molecularly oriented layer 31 and a left-eye stereoscopic image 320 in the molecularly oriented layer 32. Image 310 is shown in full lines while image 320 is shown in dotted lines. For purposes of simplification, the product shown in Fig. 2 has been considered as derived from a pair of stereoscopic records of the letter H and, in accordance with the process heretofore described, may be considered as providing a full-color stereoscopic transparency.

Viewing is carried out by observing these light-polarizing images 310 and 320 through polarizing filters located in front of each eye of the observer with the transmission axes thereof positioned at 90° to each other. Additionally, the light-polarizing filters are so positioned with respect to the light-polarizing images in the film 30 that each has its respective polarizing axis crossed or at 90° to the polarizing axis of the image to be observed therethrough. In this way, each eye sees substantially only the image intended for it.

It will be realized that the printing of light-polarizing images in the film stock of this invention is in no way restricted to the employment of gelatin washoff relief matrices. Any other procedure may be employed. As one alternative, the invention embraces the use of photomechanical printing plates or matrices such as halftone, line drawing and lithograph plates or matrices as means for printing images.

Photomechanical printing matrices may be used for printing dichroic dye images directly in undyed and oriented sheet stock which has been subjected to the pretreatment practices of this invention. As an alternative, a photomechanical printing matrix may be used to print a resist area on oriented sheet stock which has been pretreated and substantially uniformly dyed in accordance with the practices set forth herein, following which the dye, in portions of the stock uncovered by the resist, is bleached. Upon the removal of the resist, the polarizing and bleached nonpolarizing areas may be used for positive and negative image formation or vice-versa.

Photomechanical printing is carried out by applying the matrix, after it has been wet or inked with a dichroic dye or a resist, into pressure contact with the sheet stock.

Procedures for forming dichroic dye images in oriented plastic sheet stock by the alternative practices described in connection with photomechanical printing are detailed in U.S. Patent 2,440,102.

As already noted, the inventive concepts of this invention embrace sheet polarizing means broadly. Thus, the layers 31 and 32 may be rendered light polarizing all over by substantially uniformly applying a dichroic dye to either or to both of said layers. Preferably, however, a sheet structure for conversion into a uniform density dye polarizer will comprise a transparent support such as the support 33 and an oriented layer such as the layer 31. Structures of this general nature and suitable for providing overall dichroic dye polarizers are disclosed in Patent No. 2,237,567.

Additionally, the film stock 30 may be employed to provide two-dimensional light-polarizing dye images by limiting image reproduction to one of the layers 31 or 32, although in such event it is generally preferable to employ a structure comprising the support 33 and only one image-bearing layer.

The molecular orientation of a plastic sheet is customarily carried out by stretching the sheet in the presence of heat and by the application to the sheet of opposed tensional forces. As will be well understood, the result of such stretching is to cause orientation of the molecules of the sheet in a direction which is substantially parallel to the direction of application of the opposed stretching forces.

The degree of stretching imparted to a plastic sheet is conventionally measured by what is called the axial ratio which is a quantity determined by the ratio of the major axis to the minor axis of the ellipse appearing on the plastic sheet after the sheet is stretched and is derived as a result of the stretching of said sheet from a circle printed on the sheet before stretching. In general, the higher the axial ratio, the higher the efficiency of the sheet as a light polarizer. Axial ratios of 3 and greater are of a nature suitable for providing molecularly oriented sheet of high orientation. Current production practices are consistently carried out to provide axial ratios of around 6 for molecularly oriented polyvinyl alcohol sheet. The present invention is concerned with molecularly oriented plastic sheet stock which has an axial ratio of, or higher than, the value just noted.

One effect of stretching a plastic sheet, such as polyvinyl alcohol, is to cause the sheet to develop a resistance to dissolution in aqueous solution at given temperature. In general, this decrease in solubility of the plastic material in aqueous solution is a function of the degree of its molecular orientation. Such decrease in the solubility of the plastic material affects the ability of an aqueous solution to permeate a sheet of the same and, at least to some extent, affects the introduction of the desired quantity of a dichroic dye solution into the sheet, whereby the resulting product may lack the desired dye density.

To overcome this difficulty, the present invention proposes to treat the material of the sheet or layer to be dyed with a solution comprising a special reagent or combination of reagents adapted to render the material more readily receptive to dye which is introduced therein in aqueous solution. This treatment is designed to promote dye transfer to a dyeable layer from a printing matrix or the introduction by other means of dye from an aqueous solution into a layer of dyeable material by increasing the quantity of dye removed from the matrix or solution and by speeding up the rate of dye transfer or introduction. A result of this treatment is to provide products having a dye density greatly increased over untreated products of this character.

The imbibition of an aqueous solution into a hydrophilic plastic material is most effectively carried out when the material is completely or partially free of liquid which has been previously absorbed therein. It is therefore generally desirable to remove at least a part of the pretreating liquid penetrated into the plastic material before again subjecting the material to treatment with an aqueous solution such as a prewetting solution or dye solution. Such removal may be by either partial or complete drying of the plastic material. Although not always essential, in certain instances it is also desirable to at least partially remove the reagent or reagents of the pretreating solution present within the plastic material and in surface contact therewith. Such removal is effected before drying as by rinsing, for example with water, and may be followed by blowing excess liquid off the plastic material with an air knife or by means of a squeegee.

While such removal of a pretreating reagent is generally desirable, the need thereof is dependent upon a number of factors such as the reagent concentration of the pretreating solution, the presence in the pretreating solution of a reagent which will form surface scum or surface irregularities in or on the finished plastic sheet, the presence in the finished plastic sheet of a reagent which is adversely affected by changes in the pH of the sheet brought about in the dyeing thereof, and the presence in dry sheet of a reagent capable of reacting with a solution which is used to wet the sheet prior to dyeing it as well as other and similar factors.

This pretreatment is carried out by bringing the solution of the reagent or reagents into contact with the plastic sheet stock or the material thereof and is available for the treatment of organic plastic materials of the character described. The specific examples in regard to pretreatment and which are subsequently set forth have been directed to the treatment of preformed sheet materials with reagents of the general nature just discussed. In addition, the invention includes the pretreatment of plastic material comprising the sheet when said material is in the form of flake whereby to render the material more receptive to an aqueous dye solution, followed by the conventional formation of the flake into a sheet. When flake is subjected to pretreatment, the invention also contemplates the dyeing of the flake itself or the sheet formed thereof. In this regard, the specific practices of the illustrative examples of the invention are generally suited for the pretreatment of plastic flake but, as will become apparent to the art, are subject to variation and simplification.

The invention contemplates the pretreatment of sheet stock, for example preformed sheets of polyvinyl alcohol, which are in oriented or unoriented condition. In this regard, when overall or uniform density dye polarizers are to be made, the dyeing of a preformed sheet may take place prior or subsequent to the orientation of the sheet. However, where dichroic dye images are to be reproduced in sheet stock, it is generally preferable to orient the molecules of the image-bearing layers of the stock before the dyeing step is carried out.

In general, prints which are to be projected and magnified, i.e., transparencies for motion pictures, possess higher requirements as to maximum dye densities, image resolution and dichroism than reflection prints. Thus, in the case of stereoscopic color transparencies a maximum dye density of 2.7 is an acceptable minimum for projection purposes. By this invention, as will be outlined herein, densities of 3 and over have been achieved.

One method, already found effective for obtaining high dye densities in dye polarizing means, is to incorporate a basic nitrogen-containing mordant in the molecularly oriented plastic sheet. Particular examples of suitable mordants are described in the application of William H. Ryan and Vivian K. Walworth, Serial No. 444,074, filed July 19, 1954, which discloses the use of basic nitrogen-containing mordants incorporated in molecularly oriented hydroxyl-containing vinyl polymers. Other suitable mordants include the amino-containing polyethylenic compounds set forth in the application of Elkan R. Blout, William H. Ryan, Vivian K. Walworth and Howard C. Haas, Serial No. 526,301, filed August 3, 1955, and the basic nitrogen-containing polyamides set forth in the application of Howard C. Haas, Serial No. 526,302, filed August 3, 1955. The mordant may be introduced into the sheet material by including it in the casting composition from which the sheet is cast or otherwise formed. The sheet containing the mordant is then subjected to stretching to orient the molecules thereof. Alternatively, the mordant may be introduced into a preformed sheet, which has its molecules in oriented or unoriented condition, by the imbibition into the sheet of an appropriate solution of the mordant.

A highly desirable result provided by pretreatment methods of the type described herein with respect to dyeing oriented plastic sheet, either alone or by combining these methods with a suitable mordant, is the limitation or restriction of lateral diffusion of a dye or dyes introduced to the sheet from a printing matrix so that the printed dye image formed in the oriented sheet or layer faithfully reproduces the fine detail of the matrix image. The requirements relating to resolution of dye images are particularly exacting where projection prints such as slides or motion picture prints are contemplated. In producing prints through methods of the present invention as, for example, in the production of stereoscopic image pairs of the invention, image resolution in excess of 60 lines per mm. is readily obtained.

While a mordant makes it possible to achieve excellent image resolution in the formation of light-polarizing images, the presence of a mordant in molecularly oriented plastic sheets generally exerts an adverse effect on the dichroism of the final product. Inasmuch as the dichroism of a sheet of molecularly oriented plastic which has been dyed with a dichroic dye is a measure of its effectiveness to polarize light, it here seems desirable to set forth what is meant by the terms "dichroic dye," "dichroic" and "density ratio," which latter expression is a measure of the dichroism or effectiveness of the sheet.

In this regard, by a dichroic dye, there is meant a dye whose molecules possess the property of showing dichroism. In the practice of the invention, this property is displayed when said dye is incorporated in molecularly oriented plastic materials in that the resultant stained areas show dichroism. The term "dichroism" is used herein to mean the property of differential absorption of the components of an incident beam of light depending upon the vibration directions of said components. Thus, the optical density of each area of a light-polarizing image is a function of the vibration direction of light incident thereon.

Light-polarizing images of the nature described are rendered not only in terms of density difference but in degree of light polarization and have low polarizing efficiency for light areas but high polarizing efficiency for dark areas. When a light-polarizing image is seen through a polarizer the axis of which is parallel to the polarizing axis of the image, it has extremely low contrast or may be totally invisible. Through a polarizer whose axis is at right angles to that of the light-polarizing image, the image is seen at its normal contrast. If two light-polarizing images of a stereoscopic image pair are superposed with their axes at 90° to each other and are looked at through a polarizer, ideally one image only will be visible at maximum contrast with the polarizer in one position, while the other image only will be visible when the polarizer has been rotated 90° from the first-mentioned position.

If an ideal light-polarizing sheet of the nature of layers 31 or 32 were to be observed through an analyzer whose transmission axis is parallel to that of the polarizer, the density (now conventionally designated $d_1$) would be zero. If the analyzer through which this ideal polarizer is viewed were rotated 90°, the density along this axis (now conventionally designated $d_2$) would be infinite. However, actual polarizers differ from this theoretical ideal. For example, in dye polarizers such as are used for the formation of light-polarizing color prints, the desired density $d_2$ varies with wavelength and $d_1$ is a smaller number which also varies with wavelength. The ratio $d_2/d_1$ is called the density ratio, sometimes referred to as the dichroic ratio.

It is not fully understood by a mordant incorporated in a molecularly oriented sheet plastic such as polyvinyl alcohol generally exerts the previously described adverse effect upon the dichroism of the dyed product. It has, however, been found as a part of this invention that the dichroism of molecularly oriented plastic sheet, such as polyvinyl alcohol which has a mordant distributed therein and which has been dyed with a dichroic dye, may be raised considerably if the dyed sheet is treated with one or more of the reagents heretofore described in connection with pretreatment. As will appear, a density ratio of well over 10 has been consistently achieved for dye images formed in oriented sheet plastics containing mordants by means of this aftertreatment. For stereoscopic photographic purposes, and especially in the case of projection, it is noted that a density ratio of 10 is an acceptable minimum.

It is also pointed out that in the case of unmordanted oriented materials, the pretreatment procedures heretofore generally set forth and to be described in further detail provide, as an adjunct, an effective method for producing molecularly oriented and dyed sheets of satisfactory dichroism. In general, it may be added that pretreatment aids the attainable density ratio for unmordanted materials which are dyed with a dichroic dye or dyes. However, these effects of pretreatment in connection with unmordanted materials is not clearly understood.

The pretreating and aftertreating reagents with which this invention is concerned are electrolytes, including aqueous solutions of one or more acids, or bases or salts. By a solution of one or more electrolytes, there is meant an aqueous solution of one or more substances each of which dissociates in said solution to form ions having positive or negative charges. The present invention comprehends the use of inorganic as well as organic substances of the nature just set forth. Similarly, by an electrolytic solution, there is meant a solution of one or more electrolytes.

The ability of the anions and/or cations present in a solution of an electrolyte to affect the characteristics or properties of hydrophilic colloids when in contact with a surface of the colloid, or when they have penetrated through said surface, is well recognized in the art. To give a few examples of treatment of this nature, it may be noted that one or more of the ions present in such a solution have been employed to affect the adsorption characteristics of surfaces in colloidal systems, to break up colloidal suspensions and to swell or dissolve hydrophilic polymeric material. In fact, the literature abounds with disclosures of the action of ions in the treatment of a variety of different materials and shows that certain ions are more effective in their action than are others. With the aid of this knowledge, it has been recognized that ions provided by electrolytes are classifiable in accordance with their effectiveness or activity in a recognized order or arrangement called the lyotropic series, and also frequently referred to as the Hofmeister series after the German scientist, F. Hofmeister, who set forth the effectiveness of a wide number of electrolytes for various treating purposes in a number of individual scientific papers (see F. Hofmeister, "Arch. Exptl. Path. Pharmakol.," volume 24, page 247 (1888); volume 25, page 1 (1888); volume 27, page 395 (1890); and volume 28, page 210 (1891).

The lyotropic series may be expressed as shown immediately below:

$ClO_3$, $SO_4$, $NO_3$, Cl, Br, $PO_4$, I, CNS . . . OH
K, $NH_4$, Na, Ba, Mg, Ca, Li, Zn . . . H wherein the first or upper line of the series represents anions arranged in ascending order of activity or effectiveness from left to right, while the second and lower line of the series represents cations arranged in ascending order of activity or effectiveness, as a colloid swelling agent, from left to right. Thus, the anions $ClO_3$ and OH represent the maximum differences in effectiveness between the anions of the series, while the cations K and H represent the maximum differences in effectiveness between the cations of the series. In the present invention, emphasis is directed to the activity of ions in the lyotropic series in relation to the ability of the ions to swell colloids or to render colloids more penetrable to a liquid or a solution applied thereto after pretreatment with a solution containing at least one ion of the lyotropic series.

Where the lyotropic series appears in scientific literature, it is generally set forth in association with the explanation of some specific phenomena so that frequently the investigator or writer will include only ions which best illustrate his explanation. As a result, the series is not always set forth completely. The lyotropic series, as specifically set forth in the foregoing, is a compilation made from the following recent publications: Emil Ott, H. M. Spurlin and M. W. Grafflin, "Cellulose and Cellulose Derivatives," part I, second edition, volume V of "High Polymers," Interscience Publishers, Inc., New York, 1954; and Ernest A. Hauser, "Colloidal Phenomena," chapter 10, the Technology Press, M.I.T., Cambridge, Massachusetts, 1954.

The present invention is concerned with treatment by a solution of at least one electrolyte containing at least one ion, either an anion which has greater effectiveness or activity than chloride or a cation which has a greater effectiveness or activity than barium in the lyotropic series. It may be noted that in carrying out the practices of this invention, it is unnecessary that both cations and anions of the just-noted order of effectiveness be employed. The invention is successfully carried out where only one such ion results from the dissociation of the substance which provides the solution. It is also comprehended by the invention to utilize two or more ionizable substances at least one of which possesses one of the desired ions, while the other may or may not possess an ion that falls within the useful range of the lyotropic series.

As previously intimated, the term "activity" is employed herein to indicate the ability of an ion (cation or anion) to swell hydrophilic colloids or to increase their penetrability to liquids subsequently brought into contact therewith. By terms such as "increasing activity," "greater activity" and the like, there is meant the ability of any ion in the lyotropic series to show increased effectiveness over any ion located below it in said series to swell a colloid as by causing said swelling to take place more rapidly and/or to a greater degree. Such meaning of these terms in regard to activity is also intended to include the ability of any ion in the lyotropic series to show an increased effectiveness over any ion located at a lower position in the series and the ability of the ion of higher position to place a hydrophilic colloid in a condition where liquids, applied thereto after pretreatment with a solution containing said ion of higher position, will more rapidly penetrate the colloid or penetrate it to a greater degree than if the colloid had been treated with a solution containing an ion of lower position in said series.

Preferred examples of substances which are employed by the practices of this invention in the dyeing of molecularly oriented plastic sheets such as polyvinyl alcohol for the pretreatment of said sheets or the material thereof prior to dyeing and for the aftertreatment of the dyed sheets in instances where they contain a mordant are: zinc chloride, lithium chloride, calcium thiocyanate, sodium hydroxide and sulfuric acid.

Some examples of other substances which provide suitable solutions for pretreatment and aftertreatment purposes are as follows: sodium thiocyanate, lithium nitrate, potassium mercuric acid-chloride, sulfamic acid, triethanolamine, monoethanolamine, ammonium hydroxide, zinc salicylate, boric acid, ammonium thiocyanate, lithium iodide, calcium chloride, potassium iodide, trisodium phosphate, strontium iodide and sodium iodide.

As a few examples of solutions provided by two or more electrolytes, mention is made of calcium chloride and sodium thiocyanate; sodium hydroxide and sodium chloride; and sodium hydroxide and sodium carbonate.

In more detail, it is pointed out that all pretreating practices contemplated by this invention involve the processing steps of absorbing a pretreating solution into sheet stock or the plastic material thereof, followed by the partial or complete drying thereof, and may include the removal of at least a part of the pretreating reagent or reagents from the plastic material as, for example, by means of a water rinse carried out before drying. These practices, as will presently appear, are subject to variations within the specified limits, depending upon the concentration and character of the reagent or reagents of the pretreating solutions, the physical form of the plastic material operated upon, the time sequence of subsequent processing to convert the pretreated plastic material into one of the types of dichroic dye polarizing means heretofore mentioned, and other similar considerations.

The pretreatment of preformed sheet stock which is itself in oriented or unoriented condition is initiated by immersing the stock in the aqueous solution of the reagent, or by flowing said solution onto the stock or otherwise bringing the solution into contact therewith. Pretreatment of the material from which the sheet stock is to be subsequently formed, as for example polyvinyl alcohol flake, is carried out by wetting said material with the pretreating solution as by immersion therein preparatory to forming the flake into oriented sheet stock.

Treatment of the plastic material with a solution of one or more appropriate electrolytes may be carried out over a wide temperature range, i.e., from 32° F. to 120° F. and higher with aqueous solutions having a reagent concentration of from 0.5 to 30% and for time periods of from 30 seconds to five minutes.

In general, treatment time is decreased with increase in temperature and also by employment of a high concentration of the electrolyte or electrolytes employed, although the treatment time will be influenced by other factors such as the order of activity of the ions provided by the pretreating solution and the axial ratio of the sheet stock undergoing treatment in instances where oriented sheet is treated.

In instances where desirable, removal of the pretreating reagent or reagents from the sheet stock or the plastic material thereof is next carried out, it being here noted that such removal of the pretreating reagent or reagents is never objectionable except from the standpoint of adding additional processing procedure.

As an example of a condition where rinsing is unnessary, consider the situation wherein pretreated sheet stock which is in a dry condition is to be preferentially dyed by means of an aqueous dye solution transferred thereto from a printing matrix brought into contact therewith. It is desirable to wet the sheet stock before pressing the printing matrix thereon and preferably to wet the stock with a solution of one or more reagents which improve dye transfer. If the reagent or reagents of the pretreating solution are of a character which will not form surface scrum or surface irregularities on the pretreated sheet and also will not produce adverse effects during the dyeing of the sheet or by the prewet solution, it will be unnecessary to remove the pretreating reagent or reagents. A similar situation exists when the same reagent is used in a pretreating solution and in a prewetting solution and the reagent is one which produces no undesired effects. In addition, in some instances where the pretreating reagent is used in low concentration, deleterious effects, which may be caused thereby, will be so minimized that it may also be possible to omit rinsing the pretreated plastic material prior to the drying thereof.

As specific examples of conditions where rinsing after pretreatment is unnecessary, mention is made of pretreatment of sheet stock with a solution of calcium thiocyanate and the subsequent prewetting of the sheet with a solution of sodium acetate or with a calcium thiocyanate solution.

In general, neutralization of traces of an acid pretreatment solution is unneeded, as a neutral or acid environment is unobjectionable in carrying out the dyeing step. When pretreatment is carried out with a solution of a strong alkali such as sodium hydroxide, it is desirable to rinse out the pretreating solution and furthermore to neutralize traces of the electrolytic reagent remaining in the sheet after rinsing to avoid undesired diffusion of dye when dye images are printed in the sheet stock with direct cotton dyes by means of relief printing matrices. In making uniformly dyed polarizers this problem does not occur.

Neutralization following pretreatment with sodium hydroxide is effected by contact of the sheet or the material thereof with an 0.5 to 1% solution of acetic acid for about one minute at room temperature. Following neutralization, the sheet stock or the material thereof is again rinsed in water. In instances where neutralization treatment is omitted, only one water rinse will be carried out.

As previously intimated, an important means for removing the pretreating solution from sheet stock or the plastic material thereof is by drying. For example, if the sheet stock itself is being pretreated, the sheet may be dried by a warm air blast and if it has been subjected to rinsing prior to drying, rinse water may be blown off the sheet with an air knife or otherwise removed as by a squeegee. While removal of excess liquid from the surface of the sheet as by means of an air knife will also serve to remove reagent in solution in said liquid, it will be realized that such treatment primarily serves to facilitate drying and can, of course, be omitted.

It has been previously pointed out that the formation of oriented sheet or film stock, such as that shown in Fig. 1, may take place prior to pretreatment or after pretreatment. Generally in commercial practice it will be the oriented sheet stock itself that is subjected to pretreatment, followed by removal of at least a part of the pretreating solution from the stock.

With regard to the drying of the sheet stock or the plastic material thereof, it is to be observed that the completeness with which drying is carried out is not only dependent upon removing sufficient liquid from the sheet stock or plastic material so that a dye solution may be readily adsorbed therein, but will also be dependent upon the time sequence of processing operations carried out after pretreatment to convert the sheet stock into the desired dichroic dye light-polarizing means. For example, if sheet stock, which is in oriented condition and which has been subjected to pretreatment, is to be wound into a roll and held in storage for an extended time prior to the dyeing thereof, it will be desirable to substantially completely dry the stock before winding it. On the other hand, if the dyeing operation is to be carried out as one step in continuous processing operations which are initiated with the pretreatment of the sheet stock, it will not be necessary to carry out the drying of the sheet substantially to completion.

Similar requirements insofar as concerns drying and also rinsing are applicable in regard to the pretreatment of plastic flake. For example, if the flake is to be dyed prior to being formed into sheet material, the extent of the drying may be somewhat limited, as is also the case in instances where the pretreated flake without dyeing is immediately formed into a sheet.

Of course, in all instances whether preformed sheet material or the plastic flake from which the sheet is formed is being pretreated, it is generally unobjectionable, as pointed out, to subject the pretreated sheet or flake to rinsing followed by a drying operation which may be carried out substantially to completion.

It has been mentioned that oriented sheet stock which has been pretreated may be stored for extended periods prior to the dyeing thereof. This characteristic of the sheet stock is credited to the ability of the stock to retain the beneficial properties imparted thereto by pretreatment. In fact, dichroic dye images of about the same desired degree of quality as regards maximum dye density, resolution and dichroism have been printed on oriented film stock which is of the character illustrated in Fig. 1 and which has either been held in storage for several months after its pretreatment, or which is used immediately following pretreatment.

To better illustrate the invention, a number of specific practices relating to pretreatment procedure are set forth in the following examples. The film stock referred to in each of these examples is of the character of the film stock 30 of Fig. 1 which includes layers in oriented condition and which is employable as motion picture film or cut film for the production of stereoscopic dichroic dye images. The individual steps in each specific example of pretreatment are numbered consecutively.

EXAMPLE I

1. Wet oriented film stock two minutes with 20% sodium hydroxide at about 70° F.
2. Rinse one minute in running water.
3. Wet one minute with 1% acetic acid.
4. Rinse four minutes in running water.
5. Blow off excess; dry.

EXAMPLE II

1. Wet oriented film stock four minutes with 2% calcium thiocyanate solution at about 120° F.
2. Rinse one minute in running water.
3. Blow off excess; dry.

EXAMPLE III

1. Wet oriented film stock four minutes with 10% zinc chloride solution at about 120° F.
2. Rinse one minute in running water.
3. Blow off excess; dry.

EXAMPLE IV

1. Wet oriented film stock four minutes with 20% lithium chloride solution at about 120° F.
2. Rinse one minute in running water.
3. Blow off excess; dry.

EXAMPLE V

All of the foregoing examples have set forth a rinse step. The present example illustrates pretreating solution where rinsing is omitted.

1. Wet oriented film stock two minutes in 3% calcium thiocyanate solution at about 120° F.
2. Blow off excess; dry.

An example of a prewet solution usable with the pretreatment practice of Example V comprises a 5% solution of sodium acetate. A prewet solution comprising about a 3% solution of calcium thiocyanate is also usable with the pretreatment set forth in Example V.

EXAMPLE VI

Other solutions suitable for carrying out pretreatment procedure and used under conditions of time and temperature as heretofore set forth in general and as more specifically indicated in Examples I through IV are as follows:

Solution 1:
  Zinc chloride ______________________________ g-- 10
  Water ______________________________________ ml-- 100
Solution 2:
  Trisodium phosphate ________________________ g-- 3
  Water ______________________________________ ml-- 100
Solution 3:
  Sodium carbonate ___________________________ g-- 10
  Sodium hydroxide ___________________________ g-- 10
  Water ______________________________________ ml-- 100

Note that the neutralization step and the second rinse step of Example I are employed in instances where solution 3 in the just foregoing is used for pretreatment purposes. Furthermore, in regard to solution 3, sodium carbonate is employed therein because it may be advantageously employed to toughen an oriented polyvinyl alcohol film due to its ability to precipitate polyvinyl alcohol from aqueous solution.

The oriented sheet stock after pretreatment is ready for dyeing. When dichroic dye images are to be printed in oriented film stock, such as the film stock 30 of Fig. 1, it is generally desirable to wet the film stock, as the provision of film stock in a wet condition assures good overall contact between the surface being printed and the relief printing matrix pressed thereon.

Besides water as a wetting agent, mention may also be made of a 5% solution of sodium acetate or an aqueous solution of sodium benzoate and sodium sulfate wherein the sodium benzoate has a concentration of 1% and the sodium sulfate of 4% and other alkali metal salts of weak organic acids. Application of a prewetting solution is carried out by dipping the sheet therein for a period of from a few seconds to one or two minutes at temperatures ranging from room temperature up to 120° F., after which excess solution is removed from the surface to be dyed preparatory to the dyeing step. Other prewetting solutions are disclosed in the copending joint applications of William H. Ryan and Vivian K. Walworth, Serial Nos. 431,341 and 431,396, both filed on May 21, 1954.

Following the just-described prewetting treatment, dichroic dye images are formed in the pretreated oriented film stock by appropriate direct cotton dyes transferred thereto from printing matrices which are pressed into contact with the film stock and which have aqueous dye solutions imbibed therein.

In instances where pretreated and oriented sheet stock is to be uniformly dyed to provide a uniform density dichroic dye polarizer, there are no problems as to printing matrix contact so that prewetting treatment prior to dyeing is generally unnecessary and dye imbibition may be carried out without this preliminary step.

In general, direct cotton dyes of an essentially elongated structure may be named as suitable for forming light-polarizing images in molecularly oriented plastic materials, and especially molecularly oriented polyvinyl alcohol. Dyes of this nature are set forth in the previously mentioned patents. As specific examples of suitable dyes, mention may be made of Niagara Sky Blue 6B (C.I. 518), Azoform Brilliant Blue G (C.I. 516) and Erie Fast Green CGB (C.I. 589) for cyan; Solantine Red 8BL (C.I. 278), Solantine Pink 4BL (C.I. 353)

for magenta; and Solantine Yellow 4GL (Prototype 53), Stilbene Yellow 3GA (C.I. 622) and Solantine Orange 4G (Prototype 578) for yellow. Further reference to other suitable dyes appears in the examples which subsequently follow.

While the heretofore described pretreatment is usable with either mordanted or unmordanted oriented sheet stock, it is not always necessary to employ the pretreatment for mordanted oriented stock, especially in instances where the dye mordant provides an effective mechanism for obtaining the desired high maximum dye density for the dyed stock while speeding up the rate of dye transfer. Also as intimated herein, molecularly oriented sheet stock, which is free of any mordant and which has been predeterminedly dyed with a dichroic dye or dyes, is used as a light polarizer without any aftertreatment. On the other hand, an aftertreatment of molecularly oriented sheet stock which contains a mordant is generally desirable from the standpoint of raising the dichroism of the finished product.

This aftertreatment of mordanted film stock is carried out by contacting the dyed stock with a solution containing ions within the named range of the lyotropic series much in the same manner as the pretreatment of the undyed but oriented stock. A specific example of aftertreatment follows:

EXAMPLE VII

Aftertreatment of molecularly oriented film stock, such as the stock 30 of Fig. 1, which contains a basic nitrogen-containing mordant and in which one or more dichroic dye images have been printed, is carried out in the following manner. The individual steps in this example of aftertreatment are numbered consecutively.

1. Wet the oriented and dyed film stock for a time period of from 30 seconds to one minute in a solution comprising 1% sodium hydroxide and 2½% sodium chloride at from room temperature to 120° F.
2. Rinse 15 seconds in running water at room temperature.
3. Blow off excess; dry.

When sodium hydroxide solution is employed in aftertreatment, the neutralization step of Example I is generally unnecessary. Also, it is noted that it is unnecessary to subject unmordanted sheet stock to aftertreatment since the benefits derived thereby are substantially negligible.

It is generally preferable to rinse the printed stock following aftertreatment so as to remove aftertreatment reagents which may produce undesired effects, such, for example, as by forming a scum on the surface of the printed film or by making the film sticky. However, rinsing following aftertreatment is not always necessary as, for example, in instances where the concentration of the aftertreatment solution is sufficiently low or the reagent or reagents used therein are of a nature which will cause no deleterious effects.

As may be noted in Example VI, the aftertreatment solution possesses a reagent concentration which is considerably lower than the concentrations given for sodium hydroxide pretreatment solutions. A low concentration of active reagents in aftertreatment solutions is desirable so as to make it possible to easily remove them after the solution has carried out its function. At the same time it is to be understood that any of the pretreatment solutions named in Examples I through V are suitable for use as aftertreatment solutions, although it is preferable to employ a lower concentration of the reactive ingredient or ingredients named. In general, aftertreatment solutions employ an active reagent concentration of from about 0.5% to 20% and are employed at temperatures ranging from about 70° F. to 120° F. Time periods for aftertreatment are influenced by the concentration of the treating solution and by temperature.

It is not known exactly why the pretreatments of this invention favorably influence the achievement of high orders of maximum dye density in dichroic dye polarizing products comprising one or more sheets of a molecularly oriented hydroxyl-containing polymer which may or may not have a mordant dispersed therein. Likewise, it is not entirely clear why these pretreatments favorably affect oriented sheet stock which is free of any mordant to permit the stock on dyeing to be formed into a dichroic dye polarizing product of a nature displaying exceptionally high dichroism. Similarly, it is difficult to offer an exact explanation of why a mordant present in an oriented plastic layer tends to limit the order of dichroism achievable for the layer on dyeing it with a dichroic dye or why the dichroism of this layer may be raised by the aftertreatment practice disclosed herein.

That the benefits enumerated herein by the pretreatment and aftertreatment procedures do in fact occur is borne out by the following detailed examples which set forth a comparison of density ratios obtained in pretreated and unpretreated sheet stock and in aftertreated and unaftertreated stock as well as the effect of pretreatment on maximum density in pretreated stock and unpretreated stock. In each of these examples substantially similar film strips were processed, each strip comprising film stock of the nature of the film stock 30 of Fig. 1 and having oriented layers of polyvinyl alcohol 31 and 32, with each image-bearing layer having an axial ratio of 6 or more.

EXAMPLE VIII

This example sets forth the effect of pretreatment on the density ratio of unmordanted oriented film stock.

*Density ratio*

| Dye | Pretreated by Example I | No pretreatment |
|---|---|---|
| Chlorantine Fast Red 5B (C.I. 278) | 20.2 | 14.2 |
| Pyrazolone Orange 5G (Pr. 578) | 13.8 | 10.7 |
| Erieform Violet 2R | 16.6 | 9.9 |

The Erieform Violet 2R in Example VIII is a dye made by the National Aniline Division of Allied Chemical & Dye Corporation.

EXAMPLE IX

This example sets forth the effect of aftertreatment on the density ratio of mordanted and oriented film stock which has not undergone pretreatment.

*Density ratio*

| Dye | Aftertreated by Example VI | No aftertreatment |
|---|---|---|
| Chlorantine Fast Red 5B (C.I. 278) | 18.6 | 14.4 |
| Pyrazolone Orange 5G (Pr. 578) | 13.5 | 11.2 |
| Erieform Violet 2R | 13.4 | 11.0 |

EXAMPLE X

This example sets forth the effect of pretreatment on the maximum dye density of both mordanted and oriented film stock and unmordanted and oriented film stock.

*Maximum dye density*

| Dye | Pretreated by Example I | No pretreatment |
|---|---|---|
| Mordanted Stock: | | |
|    Chlorantine Fast Red 5B (C.I. 278) | 2.22 | 1.97 |
|    Pyrazolone Orange 5G (Pr. 578) | 2.72 | 2.52 |
| Unmordanted Stock: | | |
|    Chlorantine Fast Red 5B (C.I. 278) | 3 | 2.7 |
|    Pyrazolone Orange 5G (Pr. 578) | 1.72 | 1.57 |

As has been previously stated, a mordant provides a means for readily obtaining a highly satisfactory resolution for motion picture projection purposes. In fact monochromatic as well as multicolor stereoscopic dichroic dye images have been consistently produced by the practices of this invention which utilize a mordant to provide images having a resolution approaching 70 lines per mm. While it is difficult to obtain the desired minimum acceptable resolution without the use of a mordant, it may be observed that monochromatic and multicolor dichroic dye images providing stereoscopic pairs having a resolution closely approaching 60 lines per mm. have been consistently produced by the practices of this invention in oriented and unmordanted film stock. Stereoscopic dichroic dye images of a resolution lower than 60 lines per mm. are, of course, highly useful in the production of prints and transparencies which are to be viewed by hand and not projected.

Throughout the specification and claims, reference has been made to orientable, linear, high molecular weight, hydroxyl-containing, vinyl polymers and specifically to polyvinyl alcohol. Such reference will be understood to include polymers which have not been completely hydrolyzed, as for example partially hydrolyzed polyvinyl acetate, and is further intended to embrace polymers which may or may not have been subjected to stabilization by treatment with boric acid or other cross-linking agent, provided the polymeric material exhibits essentially the properties recognized by those skilled in the art as characteristic of commercially available polyvinyl alcohol.

Since certain changes may be made in the above product and process without departing from the scope of the invention herein involved, it is intended that all matter contained in the above description or shown in the accompanying drawing shall be interpreted as illustrative and not in a limiting sense.

What is claimed is:

1. A process for producing dichroic dye light-polarizing means comprising forming into a sheet a transparent, linear, high molecular weight, hydroxyl-containing, vinyl polymer, orienting the molecules of said sheet, dyeing said polymer with at least one solution of a dichroic dye, at some stage of said process prior to the dyeing of said vinyl polymer treating said vinyl polymer by imbibing into said polymer a solution of at least one electrolyte, the ions of which include at least one ion of the class consisting of anions and cations selected from the lyotropic series and of greater activity in said series than barium and chloride, and then subjecting said polymer to a drying operation following said treatment with said solution of at least one electrolyte, whereby the dye density of said light-polarizing means is substantially raised over that of similar light-polarizing means formed by the same process excepting the step of treating said means with an electrolyte.

2. A process for producing dichroic dye light-polarizing means as defined in claim 1 including the step, carried out prior to said drying operation, of removing from said polymer at least a part of said electrolyte imbibed in solution therein.

3. A process for producing dichroic dye light-polarizing means as defined in claim 1 wherein said vinyl polymer is polyvinyl alcohol.

4. A process for producing dichroic dye light-polarizing means as defined in claim 1 wherein said solution of said dichroic dye is applied over substantially the entire area of a surface of said sheet comprising said vinyl polymer and substantially uniformly dyes said sheet.

5. A process for producing dichroic dye light-polarizing means as defined in claim 1 wherein said solution of said dichroic dye is differentially applied onto a surface of said sheet comprising said vinyl polymer and provides an image in said sheet in terms of said dichroic dye.

6. A process for producing dichroic dye light-polarizing means as defined in claim 1 wherein said solution of said electrolyte comprises sodium hydroxide.

7. A process for producing dichroic dye light-polarizing means as defined in claim 6 wherein said process comprises the steps, carried out after the imbibition into said polymer of said sodium hydroxide, of treating said polymer with a weak acid solution.

8. A process for producing dichroic dye light-polarizing means as defined in claim 1 wherein said solution of said electrolyte comprises zinc chloride.

9. A process for producing dichroic dye light-polarizing means as defined in claim 1 wherein said solution of said electrolyte comprises calcium thiocyanate.

10. A process for producing dichroic dye light-polarizing means as defined in claim 1 wherein said solution of said electrolyte comprises sulfuric acid.

11. A process for producing dichroic dye light-polarizing means as defined in claim 1 wherein said solution of said electrolyte comprises lithium chloride.

12. A process for producing dichroic dye light-polarizing means as defined in claim 1 wherein said sheet formed of said vinyl polymer has a basic nitrogen-containing dye mordant substantially uniformly distributed therein.

13. A process for producing dichroic dye light-polarizing means as defined in claim 1 wherein said solution of at least one electrolyte is imbibed into a sheet of said vinyl polymer which has the molecules thereof in substantially oriented condition.

14. A process for producing dichroic dye images comprising providing from a transparent, linear, high molecular weight, hydroxyl-containing, vinyl polymer an image-bearing layer which has the molecules thereof in a substantially oriented condition, printing said image-bearing layer with at least one dichroic dye image by differentially absorbing into said layer a dichroic dye solution from a printing matrix which is pressed into contact with said layer, and prior to printing said dichroic dye image in said layer subjecting said layer to pretreatment which comprises absorbing into said layer a solution of at least one electrolyte, and, immediately after acting on said layer with said solution of said electrolyte, at least partially drying said layer, at least one of the ions of said solution of said electrolyte being of the class consisting of anions and cations selected from the lyotropic series and of greater activity in said series than barium and chloride whereby the dye density of said dichroic dye images is substantially raised over that of similar dichroic dye images formed by the same process excepting the step of treating said layer with an electrolyte.

15. A process for providing stereoscopic light-polarizing dye images in film stock which comprises a pair of superposed image-bearing layers, each said layer being of a transparent, linear, high molecular weight, hydroxyl-containing, vinyl polymer with the molecules of one of said layers being oriented in a direction at substantially 90° to the direction of orientation of the molecules of the other of said layers, said process comprising the steps of printing in registered relation at least one dichroic dye image of a stereoscopic image pair in each said image-bearing layer by pressing into contact with each said layer one of a pair of printing matrices in each of which said dye solution has been absorbed and in each of which said image to be printed is reproduced, and, prior to printing said dichroic dye images, subjecting said film stock to pretreatment comprising absorbing into each image-bearing layer of said film stock a solution of at least one electrolyte and acting on each said image-bearing layer with said absorbed solution of said electrolyte, rinsing said film stock and at least partially drying each said layer, at least one of the ions of said solution of said electrolyte being of the class consisting of anions and cations selected from the lyotropic series and of greater activity in said series than barium and chloride whereby the dichroism of said light-polarizing dye images is substantially raised over that of similar dichroic dye images formed by the same process excepting the step of absorbing into each layer an electrolyte.

16. A process as defined in claim 15 wherein each printed dichroic dye image is monochromatic.

17. A process as defined in claim 15 wherein each light-polarizing image of a stereoscopic pair is a multicolor image.

18. A process for producing sheet stock transformable into light-polarizing means on the predetermined dyeing thereof with a dichroic dye, said process comprising the steps of providing a dyeable layer which comprises a transparent, linear, high molecular weight, hydroxyl-containing, vinyl polymer having the molecules of said layer predeterminedly oriented, and pretreating the material of said layer to improve its dye receptivity by absorbing into the material of which said layer is formed a solution of at least one electrolyte and, after acting on said material with said solution of said electrolyte which is absorbed therein, at least partially drying said material, at least one of the ions of said solution of said electrolyte being of the class consisting of anions and cations selected from the lyotropic series and of greater activity in said series than barium and chloride whereby the dye density of light-polarizing means produced from said sheet stock is substantially raised over that of similar light-polarizing means produced from sheet stock formed by the same process excepting the step of absorbing into said material an electrolyte.

19. A process for producing film stock for the reception of stereoscopic light-polarizing dichroic dye images which comprises the steps of providing a pair of dyeable layers in superposed relation to each other, each said layer comprising a transparent, molecularly oriented, linear, high molecular weight, hydroxyl-containing, vinyl polymer, the molecules of one of said layers being oriented in a direction at substantially 90° to the direction of orientation of the molecules of the other of said layers, and at some stage of said process absorbing a solution of at least one electrolyte into each said layer formed of said vinyl polymer and acting on said layers with said solution absorbed therein, rinsing each said layer with water and drying each said layer, at least one of the ions of said solution of said electrolyte being of the class consisting of anions and cations selected from the lyotropic series and of greater activity in said series than barium and chloride whereby the dichroism of said light-polarizing dye images is substantially raised over that of similar dichroic dye images formed by the same process excepting the step of absorbing into each layer an electrolyte.

20. A process for producing film stock as defined in claim 19 wherein each said image-bearing layer comprises polyvinyl alcohol.

21. A process for producing film stock as defined in claim 19 wherein each said image-bearing layer has incorporated therein a dye mordant comprising a basic nitrogen-containing compound.

22. A process for producing film stock as defined in claim 19 wherein each said image-bearing layer has its molecules in a substantially oriented condition at the time that said solution of said electrolyte is absorbed therein.

23. A light-polarizing product comprising a sheet material of a molecularly oriented, transparent, linear, high molecular weight, hydroxyl-containing vinyl polymer, and a dichroic direct cotton dye distributed throughout at least a part of said polymeric sheet material, said vinyl polymer having had imbibed thereinto, prior to the dyeing thereof, a solution of at least one electrolyte, the ions of which include at least one ion of the class consisting of anions and cations selected from the lyotropic series and of greater activity in said series than barium and chloride, said vinyl polymer having been subjected to a drying operation after the imbibition thereinto of said electrolyte solution, said light-polarizing product having a dye density which is substantially higher than that of a light polarizer formed, respectively, from a similar hydroxyl-containing vinyl polymer and a similar dichroic direct cotton dye, but which has had no solution of an electrolyte imbibed thereinto.

24. A light-polarizing product as defined in claim 23, wherein said vinyl polymer is polyvinyl alcohol.

25. A light-polarizing product as defined in claim 23, wherein said dichroic direct cotton dye is distributed substantially uniformly throughout the area of said sheet material.

26. A light-polarizing product as defined in claim 23, wherein said dichroic direct cotton dye is distributed differentially within the area of said sheet material and provides an image therein in terms of said dye.

27. A light-polarizing product as defined in claim 23, wherein said sheet material formed of said vinyl polymer has a basic nitrogen-containing dye mordant substantially uniformly distributed therein.

28. A light-polarizing product as defined in claim 23, wherein is included a pair of layers of said molecularly oriented, transparent, linear, high molecular weight, hydroxyl-containing vinyl polymer, the molecules of one of said layers being oriented in a direction substantially at 90° to the direction of molecular orientation of the other, each layer having printed thereon one of a pair of stereoscopic light-polarizing dye images, said images having been printed in registered relation and in terms of said dichroic direct cotton dye from a pair of printing matrices, said solution of an electrolyte having been imbibed into said layers prior to printing said images.

29. A light-polarizing product as defined in claim 28, wherein each dichroic dye light-polarizing image of a stereoscopic pair is monochromatic.

30. A light-polarizing product as defined in claim 28, wherein each dichroic dye light-polarizing image of a stereoscopic pair is a multicolor image.

31. A sheet stock adapted to be transformed into a light-polarizing product when dyed with a dichroic, direct cotton dye, said sheet stock comprising a dyeable film of a molecularly oriented, transparent, linear, high molecular weight, hydroxyl-containing vinyl polymer which has been subjected, substantially throughout its area, to a solution of at least one electrolyte, the ions of which include at least one ion of the class consisting of anions and cations selected from the lyotropic series and of greater activity in said series than barium and chloride, said film having been at least partially dried after the imbition thereinto of said solution of an electrolyte, said sheet stock, when dyed, possessing a substantially higher dye density than a molecularly oriented sheet stock formed of a similar vinyl polymer which has been similarly dyed but which has not been treated with said electrolyte solution.

32. A film stock for the reception of stereoscopic light-polarizing dichroic dye images comprising a pair of dyeable layers of a transparent, molecularly oriented, linear, high molecular weight, hydroxyl-containing, vinyl polymer, each layer being adapted to accept a dichroic direct cotton dye in the form of a printed image, the molecules of one of said layers being oriented in a direction substantially at 90° to the direction of molecular orientation of the other whereby each said image is rendered light-polarizing in one of said directions, each of said layers having had a solution of at least one electrolyte imbibed thereinto, the ions of which include at least one ion of the class consisting of anions and cations selected from the lyotropic series and of greater activity in said series than barium and chloride, said layers, when dyed, possessing a substantially higher dye density than that of a similar layer which has not been subjected to said electrolyte solution.

33. A firm stock as defined in claim 32 wherein each said dyeable layer comprises polyvinyl alcohol.

(References on following page)

References Cited in the file of this patent

UNITED STATES PATENTS

| | | |
|---|---|---|
| 2,236,061 | Izard | Mar. 25, 1941 |
| 2,315,373 | Land | Mar. 30, 1943 |
| 2,359,735 | Kienle et al. | Oct. 10, 1944 |
| 2,387,914 | Kienninger | Oct. 30, 1945 |
| 2,445,555 | Binda | July 20, 1948 |
| 2,454,515 | Land | Nov. 23, 1948 |
| 2,612,079 | Mahler | Sept. 30, 1952 |
| 2,743,993 | Rankin | May 1, 1956 |

UNITED STATES PATENT OFFICE
CERTIFICATE OF CORRECTION

Patent No. 2,892,382 June 30, 1959

William H. Ryan et al.

It is hereby certified that error appears in the above numbered patent requiring correction and that the said Letters Patent should read as corrected below.

Column 7, line 18, for "by" read -- why --; column 10, line 6, for "scrum" read -- scum --; line 58, after "place" insert -- either --.

Signed and sealed this 2nd day of April 1963.

(SEAL)
Attest:

ESTON G. JOHNSON
Attesting Officer

DAVID L. LADD
Commissioner of Patents